United States Patent [19]

Haerle

[11] Patent Number: 5,425,236
[45] Date of Patent: Jun. 20, 1995

[54] CATALYZER ARRANGEMENT FOR THE EXHAUST GASES OF AN INTERNAL COMBUSTION ENGINE

[75] Inventor: Hans A. Haerle, Bopfingen, Germany

[73] Assignee: Schwaebische Huettenwerke GmbH, Germany

[21] Appl. No.: 965,800

[22] Filed: Oct. 23, 1992

[51] Int. Cl.⁶ .................................. F01N 3/28
[52] U.S. Cl. ...................... 60/302; 60/299; 123/670
[58] Field of Search ............... 60/302, 299; 123/670

[56] References Cited

U.S. PATENT DOCUMENTS

| | | |
|---|---|---|
| 1,793,813 | 2/1931 | MacKinnon .................. 60/302 |
| 2,267,918 | 12/1941 | Hildabolt . |
| 3,087,233 | 4/1963 | Turnbull . |
| 3,124,930 | 3/1964 | Powers ...................... 60/302 |
| 3,161,478 | 12/1964 | Chessin . |
| 3,306,353 | 2/1967 | Burne . |
| 3,648,676 | 3/1972 | Lowman ................... 123/670 |
| 3,819,334 | 6/1974 | Yoshida et al. . |
| 3,904,551 | 9/1975 | Lundsager et al. . |
| 3,927,525 | 12/1975 | Jacobs ..................... 60/302 |
| 4,062,807 | 12/1977 | Suzuki . |
| 4,064,914 | 12/1977 | Grant . |
| 4,183,896 | 1/1980 | Gordon . |
| 4,220,625 | 9/1980 | Toh et al. . |
| 4,271,044 | 6/1981 | Fratzer et al. . |
| 4,301,012 | 11/1981 | Puckett . |
| 4,329,162 | 5/1982 | Pitcher, Jr. . |
| 4,359,864 | 11/1982 | Bailey . |
| 4,417,908 | 11/1983 | Pitcher, Jr. . |
| 4,515,758 | 5/1985 | Damesle et al. . |
| 4,550,707 | 11/1985 | Kervagoret .............. 123/670 |
| 4,652,286 | 3/1987 | Kusuda et al. . |
| 4,662,915 | 5/1987 | Shirai et al. . |
| 4,687,579 | 8/1987 | Bergman . |
| 4,725,411 | 2/1988 | Cornelison . |
| 4,732,593 | 3/1988 | Kondo et al. . |
| 4,758,272 | 7/1988 | Pierotti et al. . |
| 4,760,047 | 7/1988 | Jeschke et al. . |
| 4,811,707 | 3/1989 | Pfefferle ................. 123/670 |
| 4,847,230 | 7/1989 | Cyron . |
| 4,869,738 | 9/1989 | Alcorn . |
| 4,889,630 | 12/1989 | Reinhardt et al. . |
| 4,942,020 | 7/1990 | Whittenberger . |
| 4,971,769 | 11/1990 | Haerle . |
| 4,981,172 | 1/1991 | Haerle . |
| 5,009,857 | 4/1991 | Haerle . |
| 5,031,401 | 7/1991 | Hinderks . |
| 5,062,263 | 11/1991 | Carboni . |
| 5,070,694 | 12/1991 | Whittenberger . |
| 5,089,236 | 2/1992 | Clerc . |
| 5,266,279 | 11/1993 | Haerle ..................... 422/180 |

FOREIGN PATENT DOCUMENTS

| | | |
|---|---|---|
| 42301 | 12/1981 | European Pat. Off. . |
| 38371 | 2/1931 | France ...................... 60/302 |
| 1453653 | 8/1966 | France . |
| 2462188 | 2/1981 | France . |
| 2951316 | 12/1979 | Germany . |
| 3509969 | 2/1985 | Germany . |
| 3739081 | 11/1987 | Germany . |
| 3928790 | 4/1989 | Germany . |
| 3925596 | 9/1989 | Germany . |
| 3901609 | 7/1990 | Germany . |
| 3932809 | 5/1991 | Germany . |
| 54-128842 | 10/1979 | Japan . |
| 54-152241 | 11/1979 | Japan . |
| 61-287451 | 12/1986 | Japan . |
| 62-225221 | 10/1987 | Japan . |
| 9002603 | 3/1990 | WIPO . |

*Primary Examiner*—Douglas Hart
*Attorney, Agent, or Firm*—Welsh & Katz, Ltd.

[57] ABSTRACT

A catalyzer arrangement for the exhaust gases of an internal combustion engine in which the catalyzer body (6, 7) is formed from a weave, knit or fabric of metal fibers, metal chips, metal wires, metal powder or a mixture of them which is pressed together in several layers (11) to form a pack in the outlet region (4) of the cylinder of the internal combustion engine in front of the exhaust gas manifold (5) and/or in the inlet region of the exhaust gas manifold (5). In addition, or as an alternative, the cylinder crown (8) in the cylinder (2) of the internal combustion engine can also be provided with a catalyzer body (9).

22 Claims, 1 Drawing Sheet

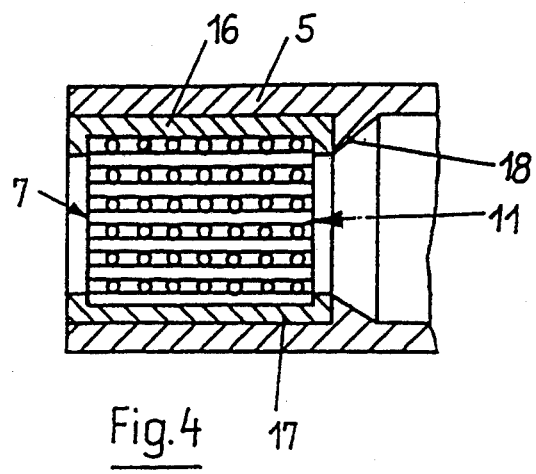
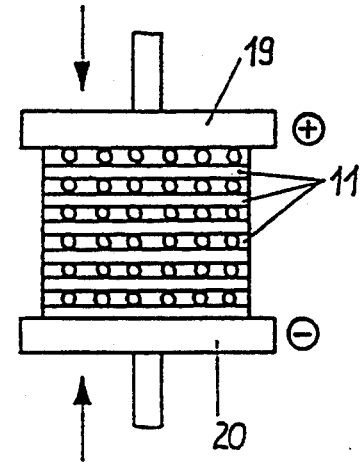
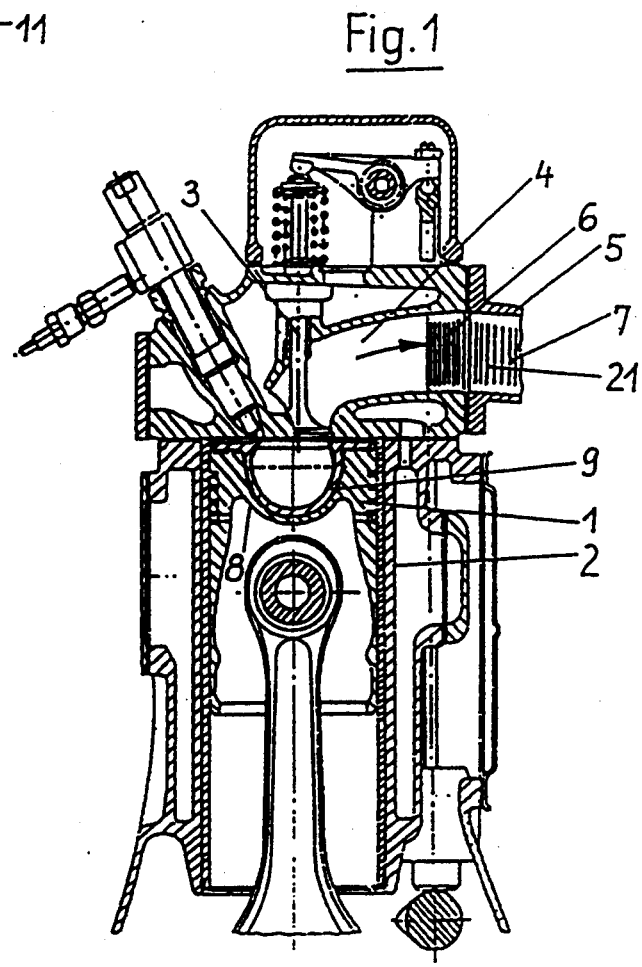
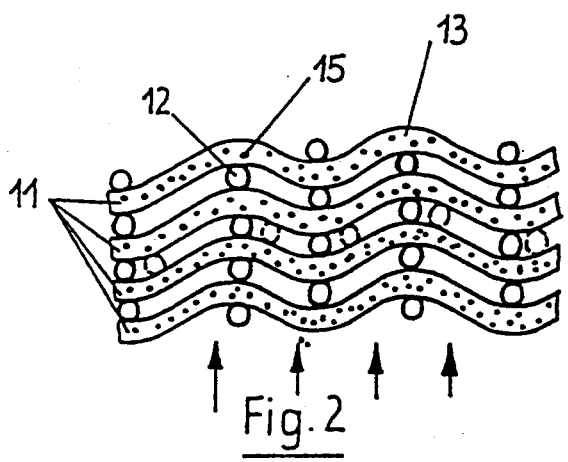
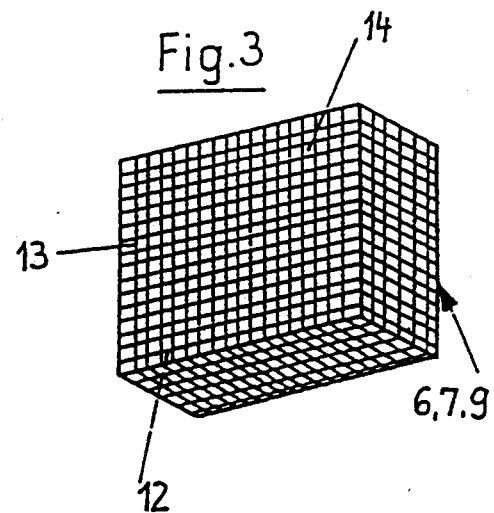

CATALYZER ARRANGEMENT FOR THE EXHAUST GASES OF AN INTERNAL COMBUSTION ENGINE

The invention concerns a catalyzer arrangement for the exhaust gases of an internal combustion engine.

From the German Offenlegungsschrift 37 43 503, it is already known art to provide a catalyzer body, consisting of a weave, knit, fabric of metal fibers, metal chips, metal wires or metal powders or a mixture of them, the catalyzer body being arranged in the exhaust gas conduit or in the exhaust system of an internal combustion engine. The catalyzer body, consisting of several layers, is formed by a sintering procedure.

From the German Offenlegungsschrift 39 25 596, it is known art to combine several layers of metal fibers or metal wires into a unit filter body by resistance welding.

In addition to metal, catalyzer bodies are also known with ceramic as the material. All the known catalyzers, however, have the disadvantage that they are located too far from the engine. This means that the flow of exhaust gas has already cooled down by some 150° to 200° C. and, because of this, the degree of chemical conversion of the exhaust gas is reduced.

Another disadvantage is that known catalyzers have gas passages with a relatively smooth surface so that there is only laminar flow of the gas in the passages. Laminar flow, however, only brings a small part of the exhaust gases into association with the catalytic coating of the catalyzer body and this also has a negative effect on the degree of conversion.

The present invention is therefore based on the object of avoiding the disadvantages quoted above and, in particular, of creating an exhaust gas cleaning system having a catalyzer which has a better efficiency.

In accordance with the invention, this exhaust gas cleaning system is created by a catalyzer arrangement in which the catalyzer body is formed from a weave, knit or fabric of metal fibers, metal chips, metal wire or metal powder or a mixture of them pressed together in one or several layers to form a pack in the exhaust region of the cylinder of the internal combustion engine in front of the exhaust manifold and/or in the inlet region of the exhaust gas manifold.

Because of the integration of a catalyzer in the cylinder space itself and/or in the inlet region of the exhaust gas manifold following on from the cylinder, the exhaust gas is led through the catalyzer body with markedly higher temperatures. This means that the efficiency is improved.

Surprisingly enough, this arrangement according to the invention has become possible because of the selection of material and the configuration of the catalyzer body. Thus it is possible, for example, to bring the weave, knit or fabric according to the invention into the most varied shapes in a simple manner. This means that the catalyzer body can be fitted without difficulty into the local situation, in particular into the shape and size of the available space in the cylinder or the exhaust gas manifold. Another advantage consists in the fact that a catalyzer body in the material quoted and with the construction given can be made very compact. This applies particularly to the configuration from a sintered material, the body being first pressed in a mold to the desired shape and then sintered.

A further advantageous arrangement of a catalyzer body, and one which is not obvious, can consist in the fact that the catalyzer body can be applied to the cylinder crown in the cylinder of the internal combustion engine. This arrangement can be either separate or associated with a catalyzer body arranged in the outlet region of the cylinder and/or in the inlet region of the exhaust manifold.

The catalyzer body arranged to be permanently connected to the cylinder crown is subjected, together with the piston, to a reciprocating motion. Because of the compressions and decompression of the exhaust gas which occurs, this exhaust gas is pressed into the catalyzer body by the piston motion and is removed from it again. This means that exhaust gas cleaning takes place even before the ejection of the exhaust gas into the exhaust manifold.

Because there are very high temperatures in this region—and these also appear shortly after the internal combustion engine starts—the catalyzer according to the invention has a very good efficiency even during initial running. This, of course, also applies in a similar manner to an arrangement of the catalyzer in the outlet region of the cylinder or in the inlet region of the exhaust gas manifold.

Because of the compactness of the catalyzer body, a heating device can also be provided to increase the efficiency without any large amount of additional complication. This heating device can heat the catalyzer for a short period when required, particularly during a cold start.

Another very advantageous further development and embodiment of the catalyzer arrangement according to the invention, and one which is not obvious, consists in the fact that each layer has a grid structure.

The grid-type construction forms continuous passages in the intermediate spaces and meshes and the exhaust gas flows through these. Because of the meshes and the mesh grid, strong eddying of the exhaust gas takes place so that there is substantially improved contact with the catalytically coated surface; this improves the degree of conversion.

The eddying, and therefore the contact, becomes even better if the meshes of layers located in series are offset relative to one another. Even a slight offset suffices, if need be, in such a manner that the exhaust gas alternatively impinges on a grid wire or passes by it so that a deflection is caused and, therefore, additional eddying.

Whereas in an arrangement of the catalyzer on the piston crown, only one or, if need be, a few layers of weave, knit or fabric are provided, a plurality of layers in series will be provided in an arrangement of the catalyzer body in the outlet region of the cylinder or in the inlet region of the exhaust gas manifold. For easier handling and better effectiveness, these layers will be permanently connected to one another to form a unit.

A possible embodiment for this purpose can consist in the fact that the layers are pressed together by a clamping device and are pushed as a unit into the outlet region of the cylinder and/or the inlet region of the exhaust gas manifold.

The mostly widely varied devices are conceivable as the clamping device. Thus, for example, a pack of a multiplicity of layers can be connected together under pressure, in the manner of a frame, by an upper plate and a lower plate.

Another possibility for forming a unit catalyzer body can consist in the fact that the individual layers are connected together by resistance welding and are pushed as a unit into the outlet region of the cylinder and/or the inlet region of the exhaust manifold.

A very advantageous embodiment can consist in the fact that the individual layers are subjected as a pack to a sintering procedure and are then pushed as a unit into the outlet region of the cylinder and/or the inlet region of the exhaust gas manifold.

A further improvement to the degree of conversion can be achieved by an increase in the surface area and-/or an additional introduction of catalytically acting material. The layers are doped with small wire pieces, fibers or the like and these are connected to the fibers, chips or wires of the weave, knit or fabric.

For this purpose, it is particularly advantageous to use irregular powder which provides a marked increased in surface area.

As an alternative to this or combined with the doping of the weave, knit or fabric with additive materials, the catalyzer body can also be subsequently put into an immersion bath. The immersion bath consists of a slurry or a suspension of particles of metal, ceramic, plastic or the like. After the body has been allowed to drip, the additional layer is hardened or subjected to a sintering process. A similar process is also known as the "washcoat process".

The exhaust gas manifold can also be provided with one or a plurality of stops to fix the position of the catalyzer body, which can be pushed as a unit into the exhaust gas manifold.

Embodiment examples of the inventions are presented in principle below by means of the drawing.

FIG. 1 shows a section through the upper part of an internal combustion engine with several catalyzer body arrangements according to the invention;

FIG. 2 shows, as an excerpt, an enlarged view of the catalyzer body according to the invention;

FIG. 3 shows a perspective view of a catalyzer body unit formed from a plurality of layers;

FIG. 4 shows a section through a catalyzer body which is held together by a clamp device;

FIG. 5 shows a section through a catalyzer body which is formed by resistance welding.

FIG. 1 shows, in principle, the upper region of an internal combustion engine with a piston 1 which moves up and down in known manner in a cylinder 2. The construction of an internal combustion engine is generally known and, for this reason, will not be considered in any more detail here. An outlet valve 3 closes off an exhaust region 4 in the cylinder 2 and frees the latter in an appropriately controlled manner in order to expel exhaust gas. The outlet region 4 is followed by an exhaust gas manifold 5.

As may be seen, a catalyzer body 6 is arranged in the outlet region 4 and a further catalyzer body 7 is arranged in the inlet region of the exhaust gas manifold 5. An appropriately curved catalyzer body 9 is applied to the curved piston crown 8 of the piston 1.

For simplicity, three possibilities of arranging a catalyzer body are shown in FIG. 1. In addition to this form, as represented, there are, of course, other possibilities of combination. Thus, for example, the catalyzer body 6 or 7 can be provided alone in association with the catalyzer body 9. Similarly, the catalyzer bodies 6 and 7 can also be provided jointly or alone.

The construction of the catalyzer body is clearly visible from FIG. 2 and 3. As shown, it is formed from several layers 11 consisting of a fabric of mutually crossing wires or fibers 12 and 13. Each layer 11 consists of a multiplicity of longitudinal wires or fibers 12 which are connected to wires or fibers 13 extending transverse to them. The wires 11, 13 can also extend in wave shape in order to increase the surface area and the stability.

It may be seen from FIG. 3 that a grid-type or honeycomb-type structure is formed, by means of this embodiment, with a multiplicity of meshes 14 through which the exhaust gas flows.

When the exhaust gas flows in accordance with the arrowed direction of FIG. 2, corresponding eddying takes place due to the wires or fibers 12 and 13. This eddying, and in consequence the improved contact with the catalytically coated wires or fibers 12, 13, is further increased if wires 12 located behind one another are arranged offset relative to one another (see dashed representation).

In order to increase the surface area and to increase the catalytic effectiveness, the individual layers can also be doped with particles in the form of small chips, small fibers or coarse powders 15 (partially shown in FIG. 2).

This doping can take place by, for example, shaking in or by means of an agent in liquid form as a carrier substance which accepts the particles, or the like. Connection then takes place by a sintering procedure or by resistance welding to the wires, fibers 12, 13.

The catalyzer body according to the invention can be produced in known manner by means of a sintering procedure of the wires and layers laid one over the other, these wires and layers being correspondingly pressed and connected together in known manner in a sintering procedure.

FIG. 4 shows an embodiment in which the individual layers are laid one above the other, pressed together by means of a clamping device with an upper plate 16 and a lower plate 17 and held in this way.

FIG. 4 also shows how the catalyzer body 7 is pushed as a unit into the exhaust gas manifold 5 and is fixed in position in this by means of one or a plurality of stops 18 at the back. The fixing takes place at the front by means of the connection of the exhaust gas manifold 5 to the cylinders.

Instead of pressing the individual layers 11 of the catalyzer body together by simple mechanical means, the individual layers can also be connected together to form a solid unit by resistance welding between two electrodes 19 and 20. The resistance welding process is generally known and for this reason, it is again not considered in any more detail in what follows.

The following materials, for example, are suitable as the material for forming the catalyzer body from the metal fibers, metal chips, metal wires, metal powder or a mixture of them:

1. Materials of an intermetallic (intensive mixing) phase, such as $Ni_3Al$, $NiAl$, $Ti_3Al$, $TiAl$, $Mg_2Si$, $Al_3Mg$, $MnZr_2$, $Ti_5Si_3$.
2. Steels with a 17–26% Cr, Ni 3–37%, Si 0.7–2.5%; $C<0.1\%$; Mn 1–2%, $P \leq 0.03\%$; $S \leq 0.02\%$, Al 0.7–6% content.
3. Steels:
    a) 18.5% Cr; 9.5% Ni, N 0.15% Si 1.3% $C<0.06\%$ and small traces of rare earth metals, mainly cerium.
    b) 21% Cr, 11% Ni, 17% Si, $C<0.1\%$ N 0.17% and rare earth metals, mainly cerium.
    c) 25% CR; 35% Ni, 1.5% Si, $C<0.05\%$ and rare earth metals, mainly cerium.

The following materials can be used as the doping particles for the individual layers 11:

1. Materials analogous to the basic material.
2. Light metal oxides such as $Al_xO_y$, $Si_xO_y$: for example $Al_2O_3$, $SiO_2$, or $SiTiO_3$, $AlTiO_5$, $SiO_2$, $ZrO_2$, SiC, $TiO_2$, $BaTiO_3$, $Si_3N_4$, $Cr_2O_3$.

The materials mentioned above can be used individually or in mixtures. In addition, carbon fibers and/or carbon particles can be added or can also be used alone.

The use of aluminium has the advantage that this precipitates on the surface and forms a very corrosion-resistant layer there. In addition, it has been found that it can form a very good "anchoring agent" for an additional layer, such as the additional application of particles in an immersion bath.

In addition, the doping particles can also act as inserts of catalytic materials such as the light metal oxides.

An addition of carbon fibers and/or carbon particles either alone or in a mixture with other particles in order to dope the catalyzer provides a further increase in the thermal resistance, which is, of course, decisive in the region selected. The carbon fibers and/or carbon particles can then be the only doping material or they can be applied as a mixture with the materials mentioned above.

Ceramic fibers, for example aluminium oxide fibers, can be included in the catalyzer body in a very advantageous manner. Such fibers reduce the removal of heat and therefore introduce an ever more rapid increase in catalyzer temperature to the necessary reaction temperature during cold starting of the engine.

In addition, these fibers have the advantage that they also improve the mechanical loading capability.

In order to increase the effectiveness of the catalyzer body 6 or 7, one or more heating rods 21 or heating grids can be pushed into the catalyzer body (see representation in principle in FIG. 1).

I claim:

1. Catalyzer arrangement for the exhaust gases of an internal combustion engine, in which the catalyzer body is formed from a structure selected from the group consisting of weave, knit and fabric of a material selected from the group consisting of metal fibers, metal wires and a mixture of said materials being pressed together in at least one layer, said layer having a grid structure and forming a pack in the outlet region of the cylinder of the internal combustion engine in front of the exhaust gas manifold, said layer being offset an adjacent layer, and said layer being doped with items selected from the group consisting of chips, small wire pieces and fillers, said items being connected to said material.

2. Arrangement according to claim 1, wherein the mesh width is 0.5 to 5 mm, preferably 1 to 2 mm.

3. Arrangement according to claim 1, wherein the wires or fibers of a layer have, at least approximately, a wave shape.

4. Arrangement according to claim 1, wherein the layers are pressed together and are pushed as a unit into the outlet region of the cylinder and/or the inlet region of the exhaust gas manifold.

5. Arrangement according to claim 1, wherein the individual layers are connected together by resistance welding and are pushed as a unit into the outlet region of the cylinder or the inlet region of the exhaust gas manifold.

6. Arrangement according to claim 1, wherein the individual layers are subjected as packs to a sintering procedure and are subsequently pushed as a unit into the outlet region of the cylinder or the inlet region of the exhaust gas manifold.

7. Arrangement according to claim 1, wherein irregular powder possessing catalytic properties is provided.

8. Arrangement according to claim 7, wherein the connection of said items to said material of said structure takes place by resistance welding or sintering.

9. Arrangement according to claim 1, wherein the catalyzer body is provided, in an immersion bath, with particles increasing the surface of the catalyzer body.

10. Arrangement according to claim 1, wherein the material for the catalyzer body has an intermetallic phase selected from the group consisting of $Ni_3Al$, NiAl, $Ti_3Al$, TiAl, $Mg_2Si$, $Al_3Mg$, $MnZr_2$, and $Ti_5Si_3$.

11. Arrangement according to claim 1, wherein the material for the catalyzer body has steels with 17–26% Cr, Ni 3–37%, Si 0.7–2.5%; C<0.1%; Mn 1–2%, P≦0.03%; S≦0.02%, Al 0.7–6% content.

12. Arrangement according to one of claim 1, wherein the material for the catalyzer body has steels with 18.5% Cr, 9.5% Ni, N 0.15%, Si 1.3%, C<0.06% and small traces of rare earth metals, mainly cerium.

13. Arrangement according to claim 1, wherein the material for the catalyzer body has steels with 21% Cr, 11% Ni, 17% Si, C<0.01% N 0.17% and small traces of rare earth metals, mainly cerium.

14. Arrangement according to claim 1, wherein the material for the catalyzer body has steels with 25% Cr, 35% Ni, 1.5% Si, C<0.05% and small traces of rare earth metals, mainly cerium.

15. Arrangement as claimed in claim 1, wherein a second material selected from the group consisting of metals, metal oxides, ceramic, plastics and a mixture of said second materials are provided as the doping particles.

16. Arrangement according to claim 15, wherein catalytically acting particles such as Cr, Va, Mo, Mn, Pt, Rh, Pd, Ti, Si are provided individually or in a mixture.

17. Arrangement according to claim 15, wherein $Al_2O_3$, $SiTiO_3$, $AlTiO_5$, $SiO_2$, $ZrO_2$, SiC, $TiO_2$, $BaTiO_3$, $Si_3N_4$, $Cr_2O_3$ are provided individually or in a mixture.

18. Arrangement according to claim 1, wherein carbon fibers and/or carbon particles are provided alone or in a mixture as said items.

19. Arrangement according to claim 1, wherein ceramic fibers, in particular aluminium oxide fibers, are provided alone or in a mixture as the doping particles.

20. The catalyzer arrangement of claim 1 wherein said catalyzer body is formed on the piston crown in the cylinder.

21. Catalyzer arrangement for the exhaust gases of an internal combustion engine, in which the catalyzer body is formed in a structure selected from the group consisting of a weave, knit and fabric and formed of a material selected from the group consisting of metal fibers, metal wires and a mixture of said materials, said materials being pressed together in at least one layer, said layer being doped with said materials so they connect to said structure and form a pack in the outlet region of the cylinder of the internal combustion engine before the exhaust gas manifold.

22. Catalyzer arrangement for the exhaust gases of an internal combustion engine, in which the catalyzer body is formed from a structure selected from the group consisting of weave, knit and fabric of a material selected from the group consisting of metal fibers, metal wires and a mixture of said materials being pressed together in at least one layer, said layer having a grid structure and forming a pack in an inlet region of the exhaust gas manifold, said layer being offset an adjacent layer, and said layer being doped with items selected from the group consisting of chips, small wire pieces and fillers, said items being connected to said material.

* * * * *